S. MALES.

Cider Mill.

No. 9,508. Reissued Dec. 21, 1880.

Attest

James H. Layman

John D. Porter

Inventor

Samuel Males by James Moore his atty.

N. PETERS, PHOTO-LITHOGRAPHER, WASHINGTON, D. C.

UNITED STATES PATENT OFFICE.

SAMUEL MALES, OF CINCINNATI, OHIO.

CIDER-MILL.

SPECIFICATION forming part of Reissued Letters Patent No. 9,508, dated December 21, 1880.

Original No. 52,583, dated February 13, 1866; Reissue No. 5,877, dated May 19, 1874; Reissue No. 6,504, dated June 22, 1875.
Application for reissue filed November 23, 1880.

*To all whom it may concern:*

Be it known that I, SAMUEL MALES, of Cincinnati, Hamilton county, Ohio, have invented certain new and useful Improvements in Cider-Mills, of which the following is a specification.

My invention relates to an arrangement of intermeshing rollers whose crushing and feeding surfaces are so formed as to assist each other in feeding the apples and retaining the broken pieces until effectually crushed between the segments thereof, with devices for feeding and breaking the apples.

Figure 1:
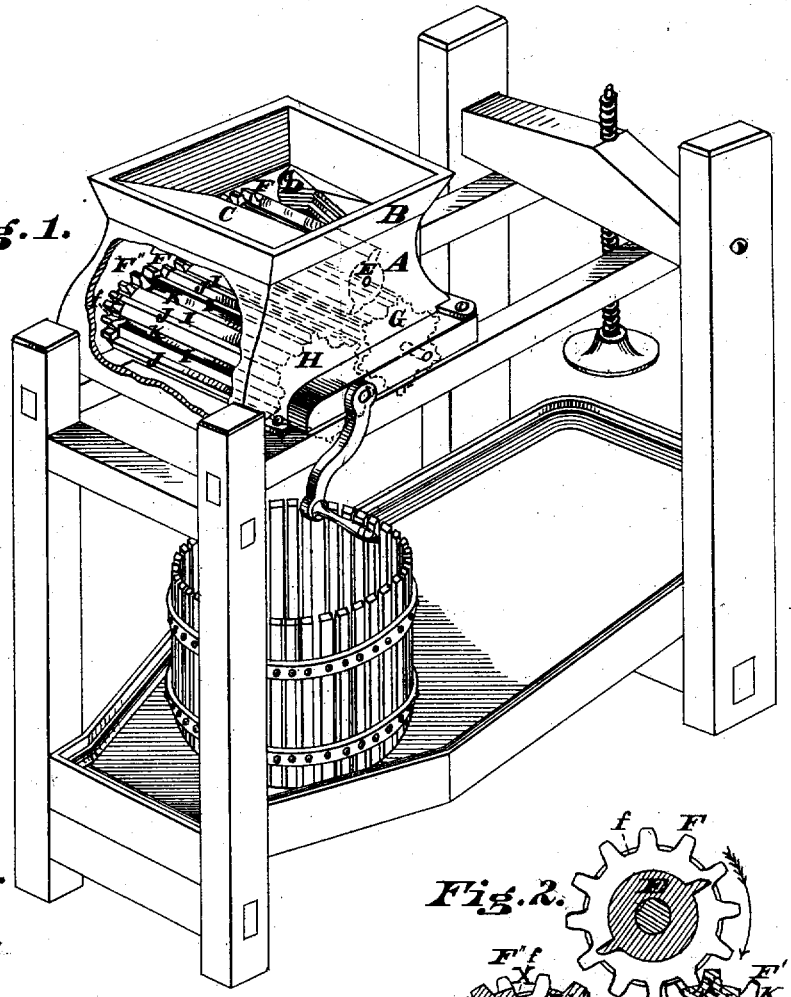
Figure 4:
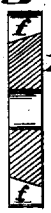
Figure 2:
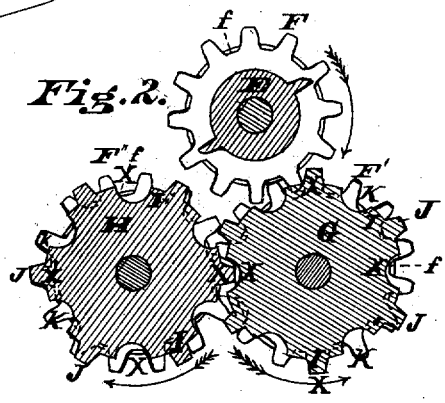
Figure 3:
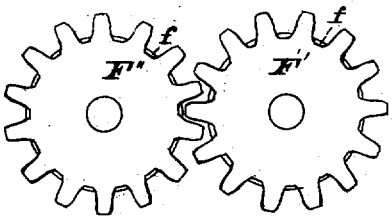

Figure 1 is a perspective view of a cider-mill embodying my invention. Fig. 2 is a transverse section of my rollers. Figs. 3 and 4 are an end view and section, respectively, of the gear-wheels, showing the chamfered bottom of the teeth.

A represents a customary inclosing-box, surmounted by a suitable hopper, B, whose chute C conducts the apples between a corrugated throat, D, and a breaking and feeding roller, E. One end of the roller E is furnished with cogs F, which cogs gear into similar cogs F′ on one of the crushing-rollers, whose cogs also gear into similar cogs F″ on the end of a precisely similar crushing-roller, H. The periphery of each crushing-roller G and H is composed of a number of cylindrical segments, I, armed along their middles with ribs J, and separated from each other by grooves K. Each rib J enters and sweeps around one of the grooves K in the other roller, and each rib J catches the broken pieces as they fall from the roller E, and as it enters a groove, K, in the other roller holds the piece between the segments I, so that it (the piece of apple) is necessarily crushed between the segments and the cells thoroughly broken.

The rollers H and G, with their gear-wheels F′ and F″, are cast or otherwise secured firmly to their shafts in such a manner that at one or more points, *x*, in the periphery of each roller a rib or groove on the roller will be exactly in line with a tooth or space in the gear-wheel. In the drawings (see Fig. 2) four such points on each roller agree in this way.

In putting the machine together it is simply necessary to bring one of these registering points in the periphery of one roller opposite one of the registering points in the opposite roller, and the ribs and grooves will be found to match properly in the motions of the rollers, and thus the marking of the gear-wheels before the machine is taken apart is obviated, and there is is no danger of getting the rollers together out of proper relation.

The mill being started and apples being fed into the hopper, the said apples are carried down the chute C between the corrugated throat D and feed-roller E, between which they are broken into small pieces, and from which they drop on rollers G and H, whose ribs J catch and hold the fragments and cause the segments of the coacting rollers to crush all the cells of the pomace. At the same time the ribs J act to strip the pomace from the surfaces I and from the grooves K, so as to preserve the full efficiency of these parts at each succeeding revolution.

I claim—

1. In combination with a pair of crushing-rollers having feeding and cleaning surfaces, consisting of intermeshing ribs and grooves and segmental spaces for crushing, a feeding and breaking apparatus consisting of a cutting-roller and corrugated throat, substantially as and for the purpose set forth.

2. The crushing-rollers H G, provided with cylindrical segments I, ribs J, and grooves K, substantially as and for the purpose specified.

SAMUEL MALES.

Witnesses:
RANKIN D. JONES,
C. A. NEALE.